United States Patent Office 3,557,053
Patented Jan. 19, 1971

3,557,053
HIGH TEMPERATURE THERMOPLASTICS STABILIZED WITH A TRIS(HALOPHENYL)PHOSPHATE, A TRIS(HALONAPHTHYL)PHOSPHATE, A TRIS(HALOPHENYL)PHOSPHINE OXIDE, A TRIS(HALONAPHTHYL)PHOSPHINE OXIDE, A POLYHALOPHOSPHATE, A POLYHALOPHENYLPHOSPHATE, A POLYHALONAPHTHYLPHOSPHATE, A POLYHALOPHOSPHATE AND MIXTURES THEREOF
Gerald W. Miller, Pittsburgh, Pa., assignor to Mobay Chemical Company, Pittsburgh, Pa., a corporation of Delaware
No Drawing. Filed Mar. 18, 1968, Ser. No. 714,029
Int. Cl. C08g 51/58
U.S. Cl. 260—45.7                    10 Claims

ABSTRACT OF THE DISCLOSURE

Self-extinguishing thermoplastics stabilized against thermal degradation with a stabilizing amount of a poly(halophenylphosphate), a poly(haloalkylphenyl)phosphate, a poly(haloalkylnapthylphosphate), a tris(haloalkylphenyl)phosphate, a tris(haloalkylnaphthyl)phosphate, a tris(haloalkylphenyl)phosphine oxide, a tris(haloalkylnaphthyl)phosphine oxide, a poly(halonaphthylphosphate), a tris(halonaphthyl)phosphate, a tris(halophenyl)phosphate, a tris(halophenyl)phosphine oxide, a tris(halonaphthyl)phosphine oxide and mixtures thereof.

STABILIZED HIGH TEMPERATURE THERMOPLASTICS

This invention relates to stabilized thermoplastic polymeric materials and, more particularly, to polycarbonates which are flame-resistant and stabilized against thermal degradation.

Polycarbonate materials are generally prepared by reacting di(hydroxyaryl)alkanes, di(hydroxyaryl)sulphones, di(hydroxyaryl)sulphoxides, di(hydroxyaryl)sulphides, di(hydroxyaryl)ethers or other aromatic dihydroxy compounds or mixtures thereof with phosgene haloformates or diesters of carbonic acid. In general, polycarbonates produced from these and other conventional materials according to conventional processes usually have a yellow or amber color at the time they are produced or else they acquire such a color upon standing. Further, the polycarbonate plastic often becomes discolored while being reheated during casting or other shaping processes in the presence of air, thus making it undesirable for the preparation of shaped articles where it is important that the material from which the article is prepared is colorless.

Although polycarbonate plastics have been classified as self-extinguishing materials by ASTM standards, and although such polymers have a relatively high temperature resistance, polycarbonate plastics are still unsuitable for many applications because they are not sufficiently flame-resistant. In order to cure this deficiency it has been proposed to use some type of high temperature material such as fiber glass with the polycarbonate to increase its temperature resistance. Although such expedients have been known to increase the heat resistance of polycarbonates by about 10° F., such a result is not sufficient to render polycarbonates sufficiently flameproof for those applications in which nonflammability is essential. It has also been proposed to coat polycarbonate parts with a heat-resistant material such as a phenolic, an epoxy or even with metal coatings of various types. However, such expedients leave much to be desired when the application requires that the integral polymer itself be flameproof or flame-resistant.

It is therefore an object of this invention to provide a thermoplastic material which is devoid of the foregoing disadvantages. It is also an object of this invention to provide stabilizers for polycarbonates which are equally efficacious for other thermoplastic materials.

Another object of this invention is to provide a method for stabilizing thermoplastics in general and polycarbonates in particular against thermal degradation.

Still another object of this invention is to provide a non-flammable or flameproof thermoplastic composition.

A further object of this invention is to provide a polycarbonate plastic stabilized against thermal degradation and the resulting discoloration attendant thereon.

A still further object of the invention is to provide a method for preventing the discoloration of a thermoplastic due to thermal degradation.

The foregoing objects and others are accomplished in accordance with this invention, generally speaking, by providing self-extinguishing, class one type thermoplastic materials in general and polycarbonates in particular stabilized against thermal degradation by having incorporated therein a stabilizing amount of a tris(halophenyl)phosphate, a tris(halonaphthyl)phosphate, a tris(halophenyl)phosphine oxide, a tris(halonaphthyl)phosphine oxide, alkyl substituted phosphates of the foregoing types wherein the alkyl group is on the phenyl or naphthyl ring such as a poly(haloalkylphenyl)phosphate, a poly(haloalkylnaphthylphosphate), a tris(haloalkylphenyl)phosphate, a tris(haloalkylnaphthyl)phosphate, a tris(haloalkylphenyl)phosphine oxide, a tris(haloalkylnaphthyl)phosphine oxide, wherein the alkyl group preferably has 1 to 18 carbon atoms, the polyhalophosphate

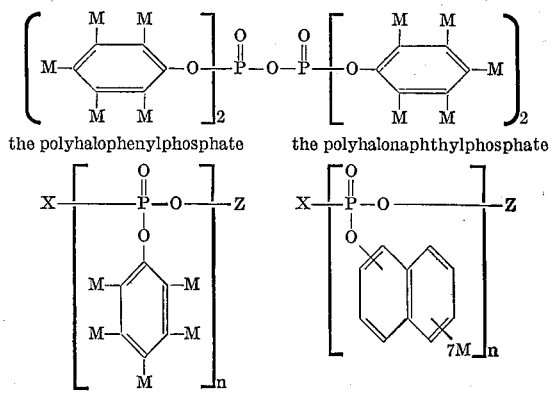

the polyhalophenylphosphate        the polyhalonaphthylphosphate and the polyhalophosphate

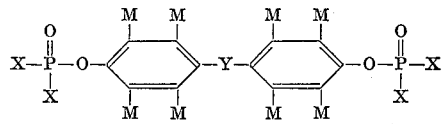

and mixtures thereof wherein halo is any suitable halogen atom such as chlorine, fluorine, bromine, iodine and the like and mixtures thereof, but preferably chlorine or bromine, at least one halo substituent on each phenyl or naphthyl ring being chlorine or bromine; M is the same or different hydrogen, alkyl radical, preferably having from 1 to about 18 carbon atoms or any suitable halogen atom as described for halo, at least one substituent M on each phenyl or naphthyl ring is chlorine or bromine, superior results being achieved when two or more substituents M on each ring are chlorine or bromine; n is any suitable integer, the upper limits of which are governed by the ease of compatability of the polyphosphate polymer with the thermoplastic with which it is to be blended as desired, but preferably, n is an integer of from about 2 to about 50; X is a halogen atom, an OH group or residue remaining after the removal of a hydroxyl hydrogen from any suitable halogenated phenol or naphthol, such as, for example, o-, m- or p-monochlorophenol, 2,3-, 2,4-, 2,5-, 2,6-, 3,4-, 3,5-dichlorophenol, 2,3,5-trichlorophenol, 2,4,6-trichlorophenol, 2,3,4,6-tetrachlorophenol, 2,3,5,6-tetrachlorophenol, pentachlorophenol, 2,3,4,5,6-pentabromophenol, o-, m-, or p-bromophenol, 2,4-, 2,6-, 3,4-, 3,5-dibromophenol, 2,3,6-, 2,3,4-, 2,4,6-tribromophenol and the like but preferably 2,4,6-tribromophenol; 4-bromo-o-naphthol, 5-chloro-b-naphthol, 2,5-dibromonaphthol, 2,4-dibromonaphthol, 1,8-dibromonaphthol, dibromo-b-naphthol(4,1), dibromo-b-naphthol-(1,5), 1,4,5-tribromo-b-naphthol, dichloro-a-naphthol-(2,4), dichloronaphthol-(4,1), dichloro-b-naphthol-(1,3), dichloro-a-naphthol-(2,4) and the like and mixtures thereof Z is hydrogen, halogen, or the residue remaining after the removal of the hydroxyl group from a halogenated phenol or naphthol, and Y is an O, S, SO, $SO_2$, C=O, alkylene or aralkylene radical.

Any suitable alkylene or aralkylene radical may be the radical Y in the foregoing formula. Some such suitable alkylene radicals include, for example, methylene, ethylene, propylene, isopropylene, butylene, isobutylene, secondary butylene, tertiary butylene, 1-methyl butylene, 3-methyl butylene, 1,1-dimethyl propylene, 1,2-dimethylene propylene, straight chained and branched isomers of hexylene, heptylene, octylene, nonylene, decylene, octadecylene and the like, cycloalkylene radicals such as cyclohexylene, cyclopentylene, cycloheptylene, cyclodecylene, cyclooctadecylene and the like, but preferably those alkylene radicals having from about one to about eighteen carbon atoms. Some suitable aralkylene radicals include, for example, benzene, a-phenylmethylene, b-phenylpropylene, g-phenylbutylene, b-phenylisobutylene, a-naphthylmethylene, a-(a' - naphthyl)ethylene, a-(b' - naphthyl)propylene, g-(b' - naphthyl)butylene, b-(a' - naphthyl)-sec-butylene and the like.

The thermoplastics in general and polycarbonates in particular which are stabilized in accordance with this invention are self-extinguishing, class one type materials which resist thermal degradation and therefore do not become discolored under continued exposure to heat. In addition, a synergistic effect has been observed with the halophosphate stabilizers of the instant invention inasmuch as only very small quantities of the stabilizers are necessary in order to yield a self-extinguishing thermoplastic polymer which is resistant to thermal degradation, particularly during the extrusion processes. The source of the synergism is not understood but may derive from the combination of the pentavalent phosphorus atom and the halogenated aryl groups.

Although the stabilizers of this invention may be used in any desired stabilizing concentration, quantities from about 0.1 percent to about 25 percent are generally sufficient to render a thermoplastic self-extinguishing and resistant to thermal degradation and preferably, from about 4 percent to about 10 percent of the stabilizer is used. It is to be emphasized, however, that greater quantities of the stabilizer of this invention may be employed and that the upper limit of the concentration range to be used is circumscribed only by economics. Particularly when being used to stabilize polycarbonates, the halogenated phosphate stabilizers of this invention may be incorporated into the polymer in large amounts without causing the corresponding deleterious effects on the mechanical properties of the polycarbonate which is observed when other thermal stabilizers such as trialkyl phosphites have been used. It is therefore entirely unexpected that the stabilizers of this invention will render a polycarbonate self-extinguishing and resistant to thermal degradation while at the same time having no deleterious effect on the physical and mechanical properties of the polycarbonate polymer itself, even when used at high concentrations.

The halophosphates of this invention may be mixed with the thermoplastic polymer to be stabilized by any suitable means. A convenient method for adding the halophosphate is to spray a solution thereof onto granules of the polymer. The halophosphates may also be introduced during the preparation of the polymer, particularly if the polymer is a polycarbonate; for example, they can be added to polycarbonates produced by an esterification process while the esterification is being effected. When a polycarbonate is produced by the phosgenation of a dihydroxy compound, a more or less viscous solution is usually formed which, after being washed free of electrolytes, can be mixed with the halophosphates of this invention or a solution thereof to obtain an essentially homogeneous dispersion. It is sometimes advantageous to add the halophosphate to the thermoplastic polymer by passing already shaped articles such as bristles spun from the polymer through a bath containing the dissolved halophosphate, in which case a thin halophosphate film is deposited on the bristles upon evaporation of the solvent. Further, the stabilizers of this invention may be thoroughly distributed in a resin by simply mixing the materials together by any of the variety of methods normally employed for the incorporation of plasticizers or fillers into thermoplastic polymers including, but not limited to mixing rolls, dough mixers, Banbury mixers, extruders and other mixing equipment.

Any suitable polycarbonate may be stabilized in accordance with this invention. For example, the carbonate polymers may be prepared by reacting a dihydric phenol with carbonate precursors such as phosgene, a haloformate or a carbonate ester. Some suitable reactants and processes for the preparation of polycarbonates are set forth, for example, in Canadian Pats. Nos. 578,585; 578,795; 594,805 and U.S. Pats. Nos. 3,028,365; 2,970,131; 2,991,273; 2,999,835 and 3,014,891, as well as in Chemistry and Physics of Polycarbonates by Herman Schnell and Polycarbonates by William F. Christopher and Daniel W. Fox.

Generally, all polycarbonate plastics are subject to thermal discoloration regardless of the compounds from which they are formed or the process used in forming them, and all polycarbonate resins can be treated according to the process of this invention, particularly all high-molecular weight substantially linear thermoplastic polycarbonates. As indicated hereinbefore, the polycarbonate plastic can be produced from a dihydroxy diarylalkane and phosgene or a diester of carbonic acid such as, for example, by the process disclosed by Schnell et al. in Canadian Pat. No. 578,585. Another suitable method for preparing the polycarbonate plastic to be stabilized in accordance with this invention is described in U.S. Pat. No. 3,271,367 which discusses dihydroxydiarylsulphones. Other polycarbonates which can be stabilized against discoloration in accordance with this invention are disclosed in U.S. Pats. Nos. 2,999,846 and 3,062,781. Since the foregoing Canadian and United States patents are incorporated herein by reference, a detailed description of methods for making polycarbonates need not be set forth herein. Suffice it to say that this and all polycarbonates may be treated according to the process of this invention, particularly those which are of the greatest commercial importance and which have weight average molecular weights of at least about 5,000 and most preferably between about 25,000 and 150,000.

Any other suitable thermoplastic resin may be stabilized in accordance with this invention. For example, some other polymeric materials which can be so stabilized are polysulfones, polyamides, polypropylene oxides, polyethylene oxides, polymers composed of diphenyl and phenyl units linked by oxygen or sulfone groups polyolefins such as polyethylene, polypropylene and the like, polyethylene terephthalate and polyesters and copolyesters in general as well as any other type of thermoplastic material which is susceptible to thermal degradation and which is flammable.

In all of these cases, any amount of the halophosphates of this invention will stabilize the polymer against discoloration, and will even reduce and in some cases do away with all of the discloration which usually takes place in polycarbonate polymers after they are formed. Some specific examples of halophosphates which may be used in the practice of this invention are, for example, tris(2,4,6-tribromophenyl)phosphate,
tris(2,4,6-trichlorophenyl)phosphate,
tris(2,6-dibromo-4-chlorophenyl)phosphate,
tris(2,6-dichloro-4-bromophenyl)phosphate,
tris(4-bromophenyl)phosphate,
tris(4-chlorophenyl)phosphate,
tris(2,6-difluoro-4-bromophenyl)phosphate,
tris(2-iodo-4,6-dichlorophenyl)-phosphate,
[(2,4,6-tribromophenyl), (2,4,6-trichlorophenyl), (2,4,6-triiodophenyl)]phosphate,
[(2,4,6-tribromophenyl), (2,6-dichloro-4-bromophenyl), (4-iodophenyl)]phosphate,
tris(2-chloro-a-naphthyl)-phosphate,
tris(4-bromo-a-naphthyl)phosphate,
tris(2,4-dichloro-a-naphthyl)phosphate,
tris(2,4-dibromo-a-naphthyl)phosphate,
tris(1-bromo-b-naphthyl)phosphate,
tris(4-chloro-b-naphthyl)phosphate,
tris(2,5-dichloro-a-naphthyl)phosphate,
tris(1,4-dibromo-b-naphthyl)phoshate,
tris(2-chloro-7-bromo-a-naphthyl)phosphate,
tris(1,5-dibromo-b-naphthyl)phosphate,
tris(1-bromo-7-chloro-b-naphthyl)phosphate,
(2-bromo-a-naphthyl-4-chloro-a-naphthyl-5-iodo-a-naphthyl)phosphate,
(1,4-dibromo-b-naphthyl, 1,5-dichloro-b-naphthyl, 1-fluoro-7-iodo-b-naphthyl)phosphate,
tris(heptabromonaphthyl)phosphate,
tris(heptachloronaphthyl)phosphate,
tris(2,4,6-tribromonaphthyl)phosphate,
tris(2,4,6-tribromo-3,5-dioctadecylnaphthyl)phosphate,
tris(2,3,6,7-tetrachloronaphthy)phosphate,
tris(2,3,6,7-tetrabromo-4,5-diiodonaphthyl)phosphate,
tris(2,6-difluoro-4-bromophenyl)phosphine oxide,
tris(2-iodo-4,6-dichlorophenyl)phosphine oxide,
[2,4,6-tribromophenyl), (2,4,6-trichlorophenyl), (2,4,6-triiodophenyl)]phosphine oxide,
[(2,4,6-tribromophenyl), (2,6-dichloro-4-bromophenyl), (4-iodophenyl)]phosphine oxide,
tris(2-chloro-a-naphthyl) phosphine oxide,
tris(4-bromo-a-naphthyl)phosphine oxide,
tris(2,4-dichloro-a-naphthyl)phosphine oxide,
tris(2,4-dibromo-a-naphthyl)-phosphine oxide,
tris(1-bromo-b-naphthyl)phosphine oxide,
tris(4-chloro-b-naphthyl)phosphine oxide,
tris(2,5-dichloro-a-naphthyl)phosphine oxide,
tris(1,4-dibromo-b-naphthyl)phosphine oxide,
tris(2,4,6-tribromo-3,5-dioctadecylnaphthyl) phosphine oxide,
tris(2-chloro-7-bromo-a-naphthyl)- phosphine oxide,
tris(1,5-dibromo-b-naphthyl)phosphine oxide,
tris(1-bromo-7-chloro-b-naphthyl)phosphine oxide,
(2-bromo-a-naphthyl-4-chloro-a-naphthyl-5-iodo-a-naphthyl)phosphine oxides,
(1,4-dibromo-b-naphthyl, 1,5-dichloro-b-naphthyl, 1-fluoro-7-iodo-b-naphthyl)phosphine oxide,
tris(heptabromonaphthyl)phosphine oxide,
tris(heptachloronaphthyl)phosphine oxide,
tris(2,4,6-tribromonaphthyl)phosphine oxide,
tris(2,3,6,7-tetrachloronaphthyl)phosphine oxide,
tris(2,3,6,7-tetrabromo-4,5-diiodonaphthyl)phosphine oxide,
tris(3,5-dibromotolyl)phosphate,
tris(3,5-dichlorotolyl)phosphate,
tris(3,5-dibromo-2,6-difluorotolyl)phosphate,
tris(2-iodo-3-bromotolyl)phosphate,
tris(2,3,5,6-tetrabromotolyl)phosphate,
tris(2,3,5,6-tetrachlorotolyl)phosphate,
(3,5-dibromotolyl, 3,5-dichlorotolyl, 3,5-diiodotolyl)-phosphate,
tris(2-bromotolyl)phosphate,
tris(3-bromotolyl)phosphate,
tris(2-chlorotolyl)phosphate,
tris(3-chlorotolyl) phosphate,
tris(2-bromocumenyl)phosphate,
tris(2-chlorocumenyl)phosphate,
tris(2,6-dibromocumenyl)phosphate,
tris(2,6-dichlorocumenyl)phosphate,
tris(2,3,6-tribromocumenyl)phosphate,
tris(2,3,6-trichlorocumenyl)phosphate,
tris(2-bromo-6-iodocumenyl)phosphate,
tris(2-bromo-6-fluorocumenyl)phosphate,
tris(2,6-difluoro-3-bromocumenyl)phosphate,
(2-bromocumenyl, 2-chlorocumenyl, 2,6-diiodocumenyl)- phosphate,
tris(2,4,6-tribromophenyl)phosphine oxide,
tris(2,4,6-trichlorophenyl)phosphine oxide,
tris(2,6-dibromo-4-chlorophenyl)phosphine oxide,
tris(2,6-dichloro-4-bromophenyl)phosphine oxide,
tris(4-bromophenyl)-phosphine oxide,
tris(4-chlorophenyl)phosphine oxide,
tris(3,5-dibromotolyl)phosphine oxide,
tris(3,5-dichlorotolyl)phosphine oxide,
tris(3,5-dibromo-2,6-difluorotolyl)phosphine oxide,
tris(2-iodo-3-bromotolyl)phosphine oxide,
tris(2,3,5,6-tetrabromotolyl)phosphine oxide,
tris(2,3,5,6-tetrachlorotolyl)phosphine oxide,
(3,5-dibromotolyl, 3,5-dichlorotolyl, 3,5-diiodotolyl)- phosphine oxide,
tris(2-bromotolyl)phosphine oxide,
tris(3-bromotolyl)phosphine oxide,
tris(2-chlorotolyl)phosphine oxide,
tris(3-chlorotolyl)phosphine oxide,
tris(2-bromocumenyl)phosphine oxide,
tris(2-chlorocumenyl)phosphine oxide,
tris(2,6-dibromocumenyl)phosphine oxide,
tris(2,6-dichlorocumenyl)phosphine oxide,
tris(2,3,6-tribromocumenyl)phosphine oxide,
tris(2,3,6-trichlorocumenyl)phosphine oxide,
tris(2-bromo-6-iodocumenyl)phosphine oxide,
tris(2-bromo-6-fluorocumenyl)phosphine oxide,
tris(2,6-difluoro-3-bromocumenyl)phosphine oxide,
(2-bromocumenyl, 2-chlorocumenyl, 2,6-diiodocumenyl)- phosphine oxide and the like and mixtures thereof.

Some specific diphosphates which may be used have the formula

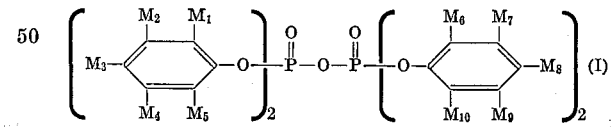

wherein the M substituents have the following values, for example:

| $M_1$ | $M_2$ | $M_3$ | $M_4$ | $M_5$ | $M_6$ | $M_7$ | $M_8$ | $M_9$ | $M_{10}$ |
|---|---|---|---|---|---|---|---|---|---|
| Br | H | Br | H | Br | Br | H | Br | H | Br |
| Cl | H | Cl | H | Cl | Cl | H | Cl | H | Cl |
| H | CH₃ | H | CH₃ | H | H | CH₃ | H | CH₃ | H |
| CH₃ | H | Br | H | CH₃ | CH₃ | H | Br | H | CH₃ |
| Br | Br | Br | Br | Br | Br | Br | Br | Br | Br |
| Cl | Cl | Cl | Cl | Cl | Cl | Cl | Cl | Cl | Cl |
| Br | Br | H | Br | Br | Br | Br | H | Br | Br |
| Cl | Cl | H | Cl | Cl | Cl | Cl | H | Cl | Cl |
| Br | H | Br | H | Br | Cl | H | Cl | H | Cl |
| H | CH₃ | Cl | CH₃ | H | H | CH₃ | Cl | CH₃ | H |
| Cl | H | C₁₈H₃₅ | H | Cl | Cl | H | C₁₈H₃₅ | H | Cl |
| Br | H | C₁₈H₃₅ | H | Br | Br | H | C₁₈H₃₅ | H | Br |
| Br | F | Br | F | Br | Br | F | Br | F | Br |
| Cl | F | Cl | F | Cl | Cl | F | Cl | F | Cl |
| Br | H | C₆H₁₁ | H | Br | Br | H | C₆H₁₁ | H | Br |
| Cl | H | C₈H₁₅ | H | Cl | Cl | H | C₈H₁₅ | H | Cl |
| Br | Br | Br | Br | Br | Cl | Cl | Cl | Cl | Cl |
| H | H | Br | H | H | H | H | Br | H | H |
| H | H | Cl | H | H | H | H | Cl | H | H |
| H | H | Br | H | H | H | H | Cl | H | H |

Some specific polyhalophenylphosphates which may be used have the formula

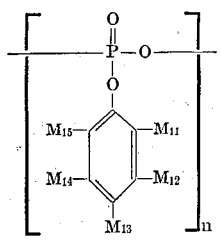

(II)

wherein the substituents M and subscript $n$ have the following values, for example:

| $M_{11}$ | $M_{12}$ | $M_{13}$ | $M_{14}$ | $M_{15}$ | $n$ |
|---|---|---|---|---|---|
| Br | H | Br | H | Br | 2 |
| Cl | H | Cl | H | Cl | 2 |
| CH$_3$ | H | Cl | H | CH$_3$ | 6 |
| C$_3$H$_5$ | H | Br | H | C$_3$H$_5$ | 11 |
| Br | H | F | H | Br | 15 |
| H | Cl | F | Cl | H | 17 |
| Cl | H | F | H | Cl | 20 |
| Br | Br | Br | Br | Br | 2 |
| Br | Br | Br | Br | Br | 50 |
| Cl | Cl | Cl | Cl | Cl | 2 |
| Cl | Cl | Cl | Cl | Cl | 50 |
| Br | Br | H | Br | Br | 25 |
| Cl | Cl | H | Cl | Cl | 25 |
| Br | Br | C$_{18}$H$_{35}$ | Br | Br | 30 |
| Cl | Cl | C$_{18}$H$_{35}$ | Cl | Cl | 31 |
| C$_4$H$_7$ | H | Br | H | C$_4$H$_7$ | 40 |
| C$_8$H$_{15}$ | H | Cl | H | C$_8$H$_{15}$ | 45 |
| H | H | Br | H | H | 45 |
| H | H | Cl | H | H | 3 |
| H | Br | H | Br | H | 33 |
| H | Cl | H | Cl | H | 50 |
| Br | I | Br | Br | Br | 10 |
| Cl | I | Cl | Cl | Cl | 10 |

Some specific polyhalonaphthylphosphates which may be used have the formula

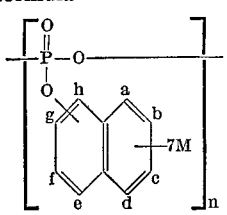

(III)

wherein the substituents M and the subscript $n$ have the following values and positions, for example:

| a | b | c | d | e | f | g | h | $n$ |
|---|---|---|---|---|---|---|---|---|
| O— | H | H | Br | Br | H | H | H | 2 |
| O— | H | H | Cl | Cl | H | H | H | 2 |
| H | O— | H | Br | Br | H | H | H | 5 |
| H | O— | H | Cl | Cl | H | H | H | 6 |
| O— | Br | H | Br | Br | H | Br | H | 4 |
| O— | Cl | H | Cl | Cl | H | Cl | H | 8 |
| O— | Br | Br | Br | Br | Br | Br | Br | 20 |
| O— | Cl | Cl | Cl | Cl | Cl | Cl | Cl | 25 |
| Br | O— | Br | Br | Br | Br | Br | Br | 22 |
| Cl | O— | Cl | Cl | Cl | Cl | Cl | Cl | 27 |
| O— | Br | H | Br | H | H | H | H | 6 |
| O— | Cl | H | H | H | H | H | H | 10 |
| O— | Br | H | H | H | H | H | H | 12 |
| O— | Br | Br | I | I | Br | Br | H | 3 |
| O— | F | H | Br | H | F | H | Br | 5 |
| O— | Br | O— | Br | H | H | H | H | 9 |
| Br | O— | H | Cl | Cl | H | Cl | H | 16 |
| Br | O— | Br | Br | Br | Br | Br | Br | 27 |
| Cl | O— | Cl | Cl | Cl | Cl | Cl | Cl | 35 |
| O— | Br | Br | CH$_3$ | CH$_3$ | Br | Br | Br | 45 |
| O— | Cl | Cl | C$_{18}$H$_{35}$ | Cl | Cl | Cl | Cl | 50 |
| C$_3$H$_5$ | O— | Br | C$_3$H$_5$ | C$_3$H$_5$ | Br | Br | Br | 15 |
| Br | O— | Br | CH$_3$ | CH$_3$ | Br | Br | Br | 20 |
| Cl | O— | H | C$_{10}$H$_{19}$ | C$_{10}$H$_{19}$ | H | Cl | Cl | 18 |

Additional polyhalophosphates which may be used in the practice of the invention have the formula

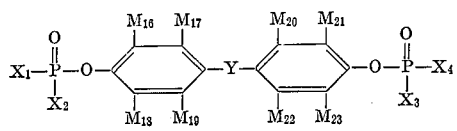

(IV)

wherein the substituents Y, M and X have the following values, for example:

| Y | $X_1$ | $X_2$ | $X_3$ | $X_4$ | $M_{16}$ | $M_{17}$ | $M_{18}$ | $M_{19}$ | $M_{20}$ | $M_{21}$ | $M_{22}$ | $M_{23}$ |
|---|---|---|---|---|---|---|---|---|---|---|---|---|
| O | ![Cl-phenoxy] | OH | OH | (¹) | Br | Br | Br | Br | Br | Br | Br | Br |
| O | ![Br2-phenoxy] | Cl | Cl | (¹) | Cl | Cl | Cl | Cl | Cl | Cl | Cl | Cl |
| O | ![Cl5-phenoxy] | Cl | Cl | Cl | Cl | Cl | Cl | Cl | Cl | Cl | Cl | Cl |
| O | ![Br5-phenoxy] | (¹) | (¹) | (¹) | Br | Br | Br | Br | Br | Br | Br | Br |

| Y | X₁ | X₂ | X₃ | X₄ | M₁₆ | M₁₇ | M₁₈ | M₁₉ | M₂₀ | M₂₁ | M₂₂ | M₂₃ |
|---|----|----|----|----|-----|-----|-----|-----|-----|-----|-----|-----|
| O | Cl | Cl | Cl | Cl | Cl | Cl | Cl | Cl | Cl | Cl | Cl | Cl |
| O | Br | Br | Br | Br | Br | Br | Br | Br | Br | Br | Br | Br |
| O | Cl | Cl | Br | Br | H | Cl | H | Cl | Cl | H | Cl | H |
| O | Br | Br | Cl | Cl | H | Br | H | Br | Br | H | Br | H |
| O | OH | (2,4-dibromophenoxy) | OH | (²) | Br | H | Br | H | H | Br | H | Br |
| O | (2,3,5,6-tetrachlorophenoxy) | Br | Br | (¹) | CH₃ | Br | CH₃ | Br | Br | CH₃ | Br | CH₃ |
| O | (4-bromophenoxy) | (¹) | (¹) | (¹) | F | Br | F | Br | Br | F | Br | F |
| O | (4-chlorophenoxy) | (¹) | (¹) | (¹) | C₁₈H₃₅ | Cl | C₁₈H₃₅ | Cl | Cl | C₁₈H₃₅ | Cl | C₁₈H₃₅ |
| O | (2,4-dibromophenoxy) | Br | (2,4-dichlorophenoxy) | Cl | C₈H₁₅ | Br | C₈H₁₅ | Br | Br | C₁₀H₁₉ | Br | C₁₀H₁₉ |
| O | (2,4,6-tribromophenoxy) | (¹) | (¹) | (¹) | Cl | F | Cl | F | F | Cl | F | Cl |
| O | Cl | Cl | Cl | Cl | I | Br | I | Br | Br | Br | Br | Br |
| O | (4-bromo-1-naphthoxy) | Br | (¹) | Br | H | Br | H | Br | Br | H | Br | H |
| O | (4-chloro-2-naphthoxy) | Cl | (¹) | Cl | H | Cl | H | Cl | Cl | H | Cl | H |
| O | (2,3-dichloro-1-naphthoxy) | OH | (2-bromo-1-naphthoxy) | CH₃ | OH₃ | Cl | CH₃ | Cl | Cl | CH₃ | Cl | CH₃ |

| Y | X₁ | X₂ | X₃ | X₄ | M₁₆ | M₁₇ | M₁₈ | M₁₉ | M₂₀ | M₂₁ | M₂₂ | M₂₃ |
|---|---|---|---|---|---|---|---|---|---|---|---|---|
| O | 1,2-naphthyl with Br at 8 and O at 2 (8-Br, 2-O—) | (¹) | (¹) | (¹) | Br | C₄H₇ | Br | C₄H₇ | C₄H₇ | Br | C₄H₇ | Br |
| O | hexabromo-naphthyl (Br at 1,3,4,5,6,8; O at 2) | (¹) | (¹) | (¹) | H | Cl | H | Cl | Cl | H | Cl | H |
| O | hexachloro-naphthyl (Cl at 1,3,4,5,6,8; O at 2) | (¹) | (¹) | (¹) | H | Br | H | Br | Br | H | Br | H |
| O | trichloro-naphthyl (Cl at 1,4,5; O at 2) | Br | (¹) | Br | C₆H₁₁ | Cl | C₆H₁₁ | Cl | Cl | C₃H₅ | Cl | C₃H₅ |
| O | tribromo-naphthyl (Br at 1,5,8; O at 2) | O.H | (¹) | O.H | Cl | Cl | Cl | Cl | Cl | Cl | Cl | Cl |

¹ Same as X₁.
² Same as X₂.

One may also substitute an S, SO, SO₂, C=O or any of the alkylene and aralkylene radicals listed herein as suitable constituents Y for the O in all of the preceding examples to obtain some specific examples of suitable stabilizers of Formula IV in which the Y constituent has a meaning other than oxygen. Although an extensive listing of compounds has been set forth, it is to be understood that these are merely exemplary and any and all compounds within the scope of the generic formula and classes of compounds set forth herein are operable and contemplated.

The phosphate and phosphine oxide stabilizers of this invention may be prepared by any suitable method such as for example any of those methods outlined in Phosphorus and Its Compounds by Van Wazer, Interscience Publishers, Inc., N.Y.; Organophosphorus Monomers and Polymers, Gefter, Associated Technical Services, Inc., N.J., Organophosphorus Compounds, G. M. Kosolapoff, N.Y., and the like.

In a preferred method of preparation, about 872 parts of a recrystallized 2,4,6-tribromophenol are dissolved in about 3 liters of toluene in a three-necked five-liter flask equipped with a stirrer and a Dean-Stark trap, and heated to boiling until all of the water has been evaporated. About 871 parts of the phenol remain after cooling to room temperature. About 266 parts of distilled triethylamine are added to the phenol and about 135 parts of phosgene are slowly added with vigorous stirring. After all of the materials have been added, the mixture is heated to about 100° C. after which it is allowed to cool. Triethylaminehydrochloride is filtered off and the toluene is decolorized with carbon black. The solution is filtered and precipitated with methanol after which the product is collected and washed with hexane and dried to yield the tris(2,4,6-tribromophenyl)phosphate product. Notwithstanding the foregoing, however, any suitable method may be used to prepare the phosphate stabilizers of this invention.

The stabilized thermoplastics of this invention may be used in any application for which such materials are eminently suitable. For example, they may be used for preparing gaskets, tubing and other materials such as films, foils, coatings, fibers and the like. Because of their improved properties, their self-extinguishing characteristics and their ability to resist thermal degradation, the polycarbonates of this invention are eminently suitable for such applications as well as any others in which the polymer will be subjected to heat.

The invention is further illustrated but is not intended to be limited by the following examples in which all parts and percentages are by weight unless otherwise specified.

EXAMPLES 1-7

The stabilizer identified in Table I in the quantity set forth therein is mixed with the indicated quantity of a polycarbonate having the indicated molecular weight and prepared by the phosgenation of 2,2-(4,4'-dihydroxydiphenyl)propane, and the mixture is extruded and pelletized. The extruded pellets retain the color of the virgin polycarbonate. After being molded into 1/16", 1/8" and 1/4" bars, each configuration passes the UL flammability test as a class one, self-extinguishing material.

TABLE I

| Additive | Quantity, parts | PC quantity, parts | Mol. weight | UL flammability est 1/16" | 1/8" | 1/4" |
|---|---|---|---|---|---|---|
| Tris(2,4,6-tribromophenyl)phosphate | 70 | 430 | 30,000 | + | + | + |
| Tris(2,4-dibromophenyl)phosphine oxide | 10 | 90 | 60,000 | + | + | + |
| Pentabromophenylpoly-metaphosphate | 14 | 86 | 35,000 | + | + | + |
| Tris(pentabromophenyl)phosphate | 1 | 99 | 30,000 | − | + | + |
| Tris(2,4,7-tribromo-a-naphthyl)phosphate | 8 | 92 | 40,000 | + | + | + |
| Tris(4-fluoro-2,6-dibromophenyl)phosphate | 10 | 90 | 30,000 | + | + | + |
| Tris(4-chloro-3-methyl-2,6-dibromophenyl)phosphate | 2 | 98 | 30,000 | − | + | + |

EXAMPLES 8–16

The stabilizer identified in Table II in the quantity set forth therein is mixed with the indicated quantity of the polymer having the indicated molecular weight and identified in the table, and the mixture is extruded and pelletized. The extruded pellets retain the color of the virgin polymer. After being molded into 1/16", 1/8" and 1/4" bars, each configuration passes the UL flammability test as a class one, self-extinguishing material.

and the polyhalophosphate

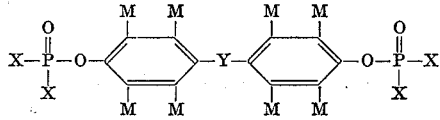

and mixtures thereof wherein halo is a halogen atom, at least one halo substituent on each phenyl or naphthyl ring being chlorine or bromine, M is the same or different hydrogen, alkyl radical or halogen atom, at least one

TABLE II

| Additive | Quantity, parts | Polymer | Quantity, parts | Mol. weight | UL flammability test 1/16" | 1/8" | 1/4" |
|---|---|---|---|---|---|---|---|
| Tris(pentabromophenyl)phosphate | 10 | Polyamide [1] | 90 | 42,000 | + | + | + |
| Tris(tribromophenyl)phosphate | 25 | Polystyrene | 75 | 200,000 | + | + | + |
| Tris(4-a,a',a''-trifluoromethyl-2,6-dibromophenyl)phosphate | 25 | Polyurethane [2] | 75 | 60,000 | + | + | + |
| Tris(pentabromophenyl)phosphine oxide | 22 | Poly(styreneacrylonitrile) | 78 | 120,000 | + | + | + |
| Tris(2,4,6-tribromophenyl)phosphate | 20 | Polymethylmethacrylate | 80 | 600,000 | + | + | + |
| Tris(2,4,6-tribromophenyl)phosphate | 5 | Polysulfone | 95 | 41,000 | + | + | + |
| Tris(2,4,6-tribromophenyl)phosphate | 7 | Polyphenyleneoxide | 93 | 50,000 | + | + | + |
| Tris(2,4,6-tribromophenyl)phosphate | 10 | Noryl [3] | 90 | 50,000 | + | + | + |
| Tris(pentabromophenyl)phosphate | 10 | Polypropylene | 90 | 100,000 | − | + | + |

[1] The condensation product of hexamethylene diamine and adipic acid.
[2] The reaction product of 4,4'-diphenylmethane diisocyanate, 1,4-butanediol and adipic acid.
[3] A mixture of polyphenylene oxide and polystyrene (product of General Electric).

It is to be understood that any of the components and conditions mentioned as suitable herein can be substituted for its counterpart in the foregoing examples and that although the invention has been described in considerable detail in the foregoing, such detail is solely for the purpose of illustration. Variations may be made in the invention by those skilled in the art without departing from the spirit and scope of the invention except as is set forth in the claims.

What is claimed is:

1. A self-extinguishing polycarbonate stabilized against thermal degradation which comprises a polycarbonate containing a stabilizing amount of a stabilizer selected from the group consisting of a tris(halophenyl)phosphate, a tris(halonaphthyl)phosphate, a tris(halophenyl)phosphine oxide, a tris(halonaphthyl)phosphine oxide, the polyhalophosphate

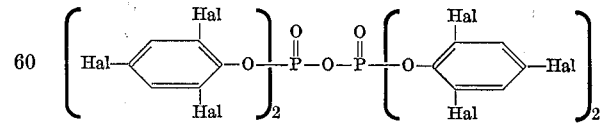

the polyhalophenylphosphate     the polyhalonaphthylphosphate

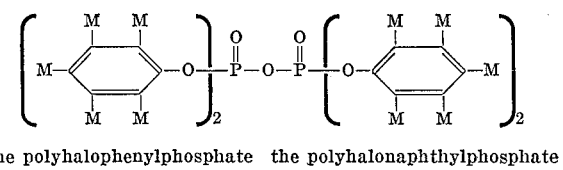 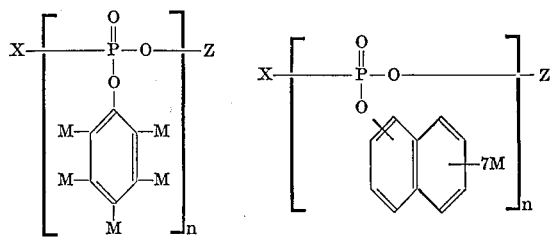

substituent M on each phenyl or naphthyl ring being chlorine or bromine, n is an integer of from about 2 to about 50, X is a halogen atom, an OH group or the residue remaining after the removal of the hydroxyl hydrogen from a halogenated phenol or naphthol, Z is hydrogen, halogen, or the residue remaining after the removal of the hydroxyl group from a halogenated phenol or naphthol and Y is an O, S, SO, $SO_2$, C=O, alkylene or aralkylene radical.

2. The polycarbonate of claim 1 wherein the stabilizer is tris(2,4,6-tribromophenyl)phosphate, or tris(2,4,6-trichlorophenyl)phosphate.

3. The polycarbonate of claim 1 wherein the stabilizer is tris(4-bromophenyl)phosphate or tris(4-chlorophenyl)phosphate.

4. The polycarbonate of claim 1 wherein the stabilizer is tris(2,4,6-tribromophenyl)phosphine oxide or tris(2,4,6-trichlorophenyl)phosphine oxide.

5. The polycarbonate of claim 1 wherein the stabilizer is

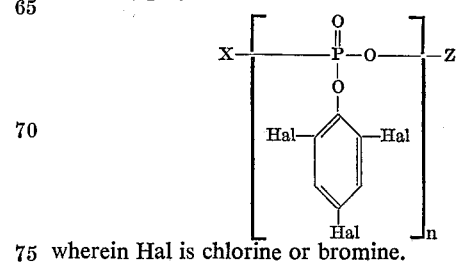

wherein Hal is chlorine or bromine.

6. The polycarbonate of claim 1 wherein the stabilizer is wherein Hal is chlorine or bromine.

7. The polycarbonate of claim 1 wherein the stabilizer is

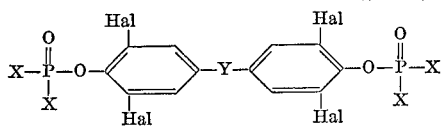

wherein Y is SO$_2$, C=O, an alkylene or an aralkylene radical; X is the residue remaining after the removal of the hydroxyl hydrogen from a halogenated phenol and Hal is bromine or chlorine.

8. The polycarbonate of claim 1 wherein the composition contains from about 0.1 percent to about 25 percent of the stabilizer.

9. The composition of claim 1 wherein the stabilizer is tris(2,4-dibromophenyl)phosphine oxide, tris(pentabromophenyl) phosphate, tris(2,4,7-tribromo-a-naphthyl)-phosphate, tris(4 - fluoro - 2,6-dibromophenyl)phosphate, tris(4-chloro-2,6-dibromophenyl)phosphate or tris(pentabromophenyl)phosphine oxide.

10. The composition of claim 1 wherein the stabilizer contains an alkyl substitution on the phenyl or naphthyl ring.

References Cited

UNITED STATES PATENTS

| | | | |
|---|---|---|---|
| 2,773,046 | 12/1956 | Dunn et al. | 260—45.7UX |
| 2,837,494 | 6/1958 | Gilbert et al. | 260—45.7X |
| 3,262,894 | 6/1966 | Green | 260—45.7UX |
| 3,269,963 | 8/1966 | Ilgemann et al. | 260—45.7X |

DONALD E. CZAJA, Primary Examiner

D. J. BARRACK, Assistant Examiner